No. 761,772. PATENTED JUNE 7, 1904.
R. KLEIN.
PHOTOGRAPHIC SHUTTER.
APPLICATION FILED JAN. 22, 1902.
NO MODEL. 3 SHEETS—SHEET 1.

Witnesses.
Walter B. Payne.
Elizabeth J. Perry.

Inventor.
Rudolph Klein
by Frederick S. Church
his Attorney

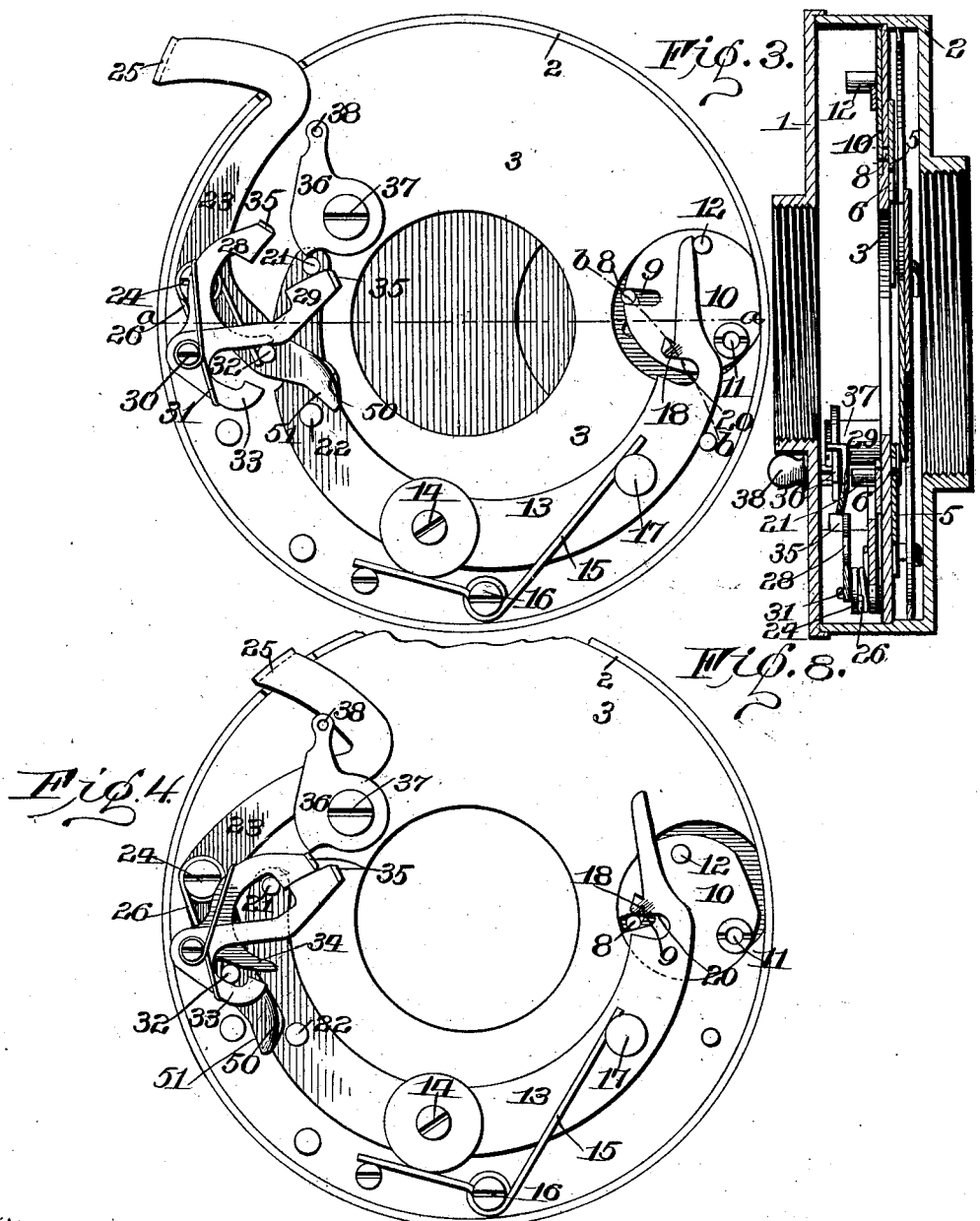

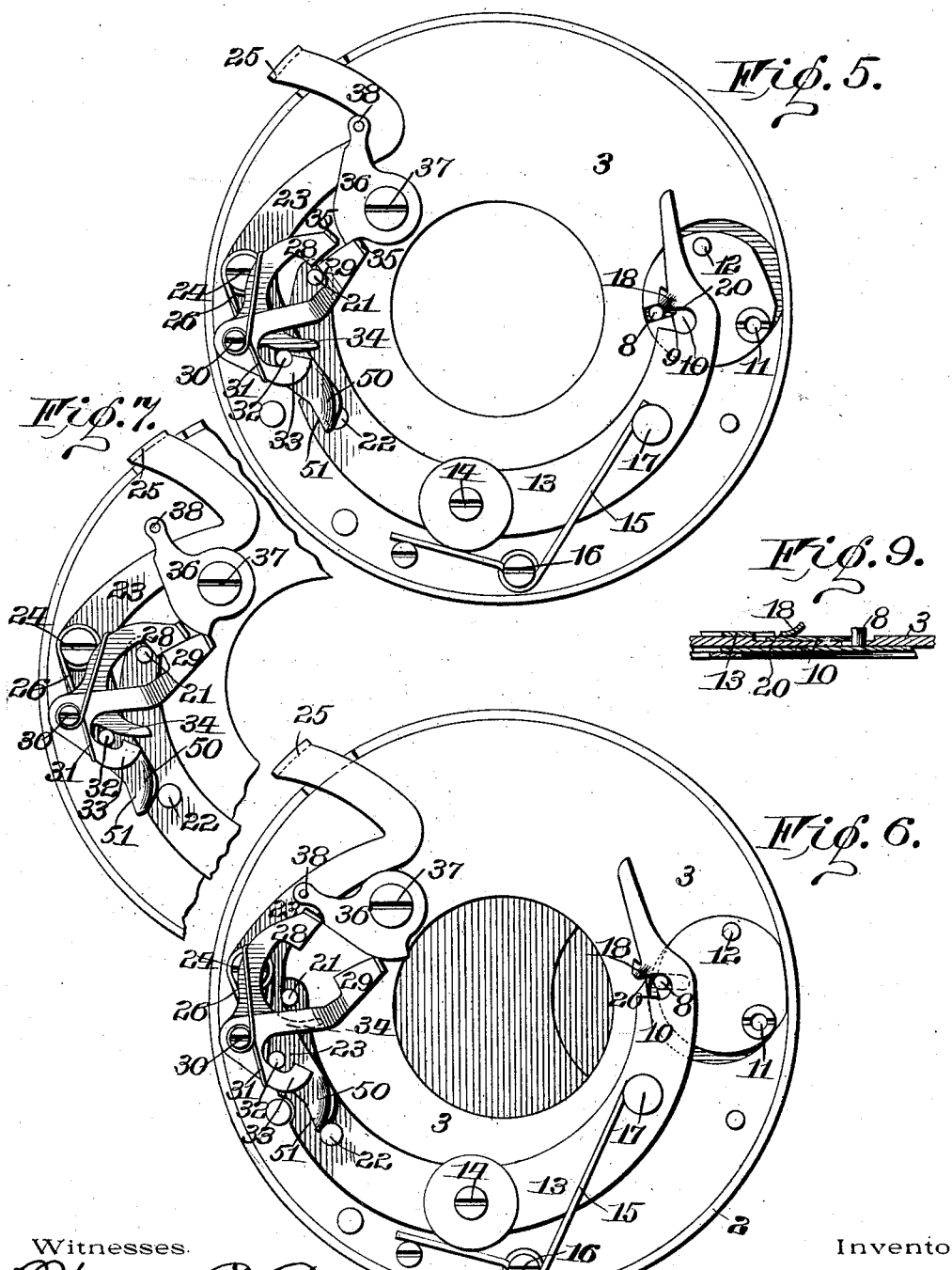

No. 761,772. Patented June 7, 1904.

UNITED STATES PATENT OFFICE.

RUDOLPH KLEIN, OF ROCHESTER, NEW YORK, ASSIGNOR TO BAUSCH & LOMB OPTICAL COMPANY, OF ROCHESTER, NEW YORK, A CORPORATION OF NEW YORK.

PHOTOGRAPHIC SHUTTER.

SPECIFICATION forming part of Letters Patent No. 761,772, dated June 7, 1904.

Application filed January 22, 1902. Serial No. 90,771. (No model.)

*To all whom it may concern:*

Be it known that I, RUDOLPH KLEIN, of Rochester, in the county of Monroe and State of New York, have invented certain new and useful Improvements in Photographic Shutters; and I do hereby declare the following to be a full, clear, and exact description of the same, reference being had to the accompanying drawings, forming a part of this specification, and to the reference-numerals marked thereon.

My present invention relates to photographic shutters, and has for its object to provide a device simple and cheap in construction and which may be operated to make time, instantaneous, and bulb exposures by the manipulation of a single part; and to these ends it consists of certain improvements hereinafter described, the novel features being pointed out in the claims at the end of this specification.

Figure 1:
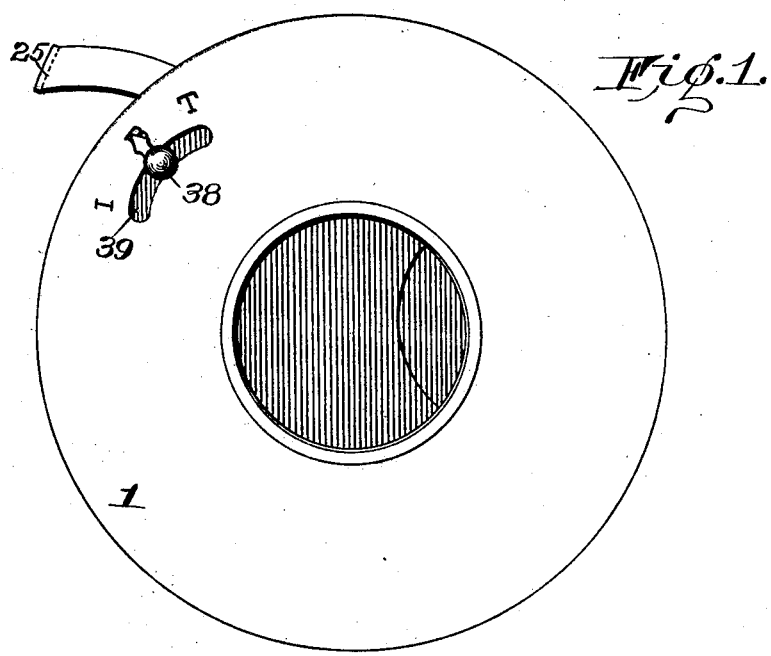
Figure 2:
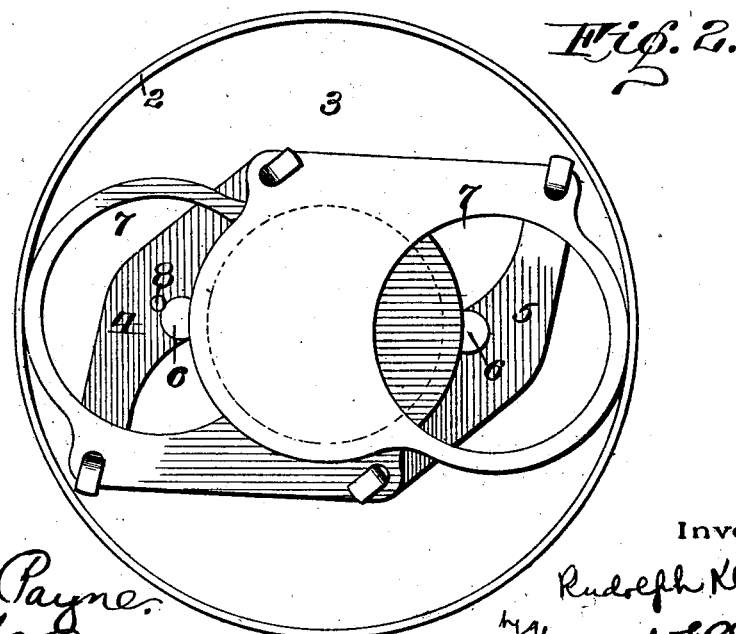

In the drawings, Figure 1 is a front view of a shutter constructed in accordance with my invention. Fig. 2 is a rear view with the outer cover-plate removed and showing the leaves or blades; Fig. 3, a front view with the front cover-plate removed, showing the shutter ready for operation and set to make a time exposure; Fig. 4, a similar view showing the shutter open and retained by the bulb-stop, making a time exposure. Fig. 5 is a similar view showing the shutter open during a time exposure and retained by the second or time stop; Fig. 6, a similar view showing the shutter set for making an instantaneous exposure at the moment the master member has been released; Fig. 7, a view of the parts when making a bulb exposure, the shutter being open. Fig. 8 is a transverse sectional view on line *a a* of Fig. 3. Fig. 9 is a sectional view on the line *b b* of Fig. 3.

Similar reference-numerals in the several figures indicate similar parts.

The casing adapted to contain my shutter may be of any suitable construction; but it is preferably arranged so that the shutter blades, plates, or leaves will operate between the lenses, or if only one lens is employed they may be in rear thereof, and in the present embodiment consists of an annular casing having a front plate 1 and a rear plate 2 and the intermediate septum or supporting plate 3, upon which latter the operating and controlling parts of the shutter are mounted. The shutter blades or leaves may be of any suitable construction; but I prefer to form them as shown in Fig. 2, two being employed in the present instance loosely pivoted at the opposite ends of levers 4 and 5, pivoted at 6 in the septum or diaphragm, the said plates or leaves having the aperture 7 and the overlapping opaque portions which coöperate to close the lens-aperture when in the position shown in Figs. 1, 2, 3, and 6. The operating-lever 4 is provided eccentrically of its pivot with a pin or projection 8, extending through an opening or slot in the septum or support 3 and projecting into a slot 9, formed in a lever or plate 10, pivoted at 11. This lever or plate 10 is also provided with a pin or projection 12 and, with said pins 8 and 12, is adapted to coöperate one end of the master member or lever 13, pivoted at 14 upon the support 3. This master member is normally retained in and automatically moved to the position shown in Fig. 3 by a spring 15, coiled about a stationary stud 16 and having its upper free end adapted to engage a stud or projection 17, arranged upon the master member, and near this end the member is provided with an upturned lip or latch 18, beveled or inclined on one edge and coöperating with the pin 8 on the operating-lever 4 to flex the end of the member laterally when moved toward the center of the shutter-casing and to pass over the pin, and the rear side 20 of said latch is adapted to engage the pin 8 and throw the shutter open during the movement of the master member from the position in Fig. 6 to that in Fig. 5. In the present construction for the purpose of closing the shutter by the master member the end of the master member is extended beyond the latch 18 in position to coöperate with the pin 12 on the lever 10 and operate the latter, and through it the lever 4, to close the shutter when the master member moves outward, although this extension is not necessary and other means could be relied upon to close the shutter automatically instead of this positive operation. The shutter-wings are normally held in closed position, as in Fig. 3, by the master member operating upon the lever 10 and the pivots 6 and 14 and are so relatively arranged that the movement of this end of the master member inwardly or toward the lens-opening will cause the lip 18 to slide over the pin 8 without opening the shutter; but when the master member is moved in the opposite direction by its spring the shoulder 20 in the rear of the lip will engage the pin 8 and turn the exposure-lever in the direction of the arrow in Fig. 4 until the pin passes out of contact with the end of the lip, when the shutter will be returned to first or normal position by the engagement of the master member with the pin 12. The master member in this arrangement thus serves as a means for causing the positive return of the exposure-lever or insuring its operation, the pin 12 and the extension of the master member coöperating. The master member is provided at its extreme end on the opposite side of the pivot from the lenses described with the pin or projection 21 and at a point nearer its pivot with a projection 22, which latter is adapted to coöperate with the ends of the operating member 23 in the form of a lever, pivoted at 24, and provided with an extension or operating portion 25, passing out through the side of the casing. The inner end of this operating member is moved inward or toward the center of the shutter by the spring 26, and the inner side of the end is turned upwardly, as shown at 50, forming a latch, and the lever itself is of spring material, so that its end may be flexed laterally by the beveled pin 22 on the master member, allowing the inner end of the operating-lever to move in one direction without moving the master member and also allowing the master member to move in one direction free of the operating member; but the shoulder 51 in rear of said latch end 50 will cause the master member to be moved outwardly by the operating member and then released by the passage of the end of the latter off the pin 22, and this by reason of the different centers of motion of said members.

The pivots of the operating and master levers are not concentric and are so arranged that when the operating-lever is moved against the tension of its spring it will first move the master member by engaging the pin 22 and then pass out of engagement with it, allowing the spring to return the latter to normal position, opening and closing the shutter wings or leaves.

For the purpose of controlling the movements of the master member to adapt the shutter for making different kinds of exposures I provide two pivoted stops or catches 28 and 29, pivoted at 30 and operated toward each other by the spring 31. The catch 28, which I will term the "bulb-catch," has its engagement portion a shorter distance from the pivot than the catch 29; but, as usual, both of these catches are adapted to coöperate with the pin 21 on the master member in succession when a time exposure is to be made, one only engaging said member when a bulb exposure is to be made.

32 indicates a pin on the operating-lever 23 adapted to engage the extension 33 of the catch 29 and to engage an extension 34 of the catch 28. Both catches are provided at their ends with lugs or projections 35, with which is adapted to coöperate cam-plate or setting member 36, pivoted at 37 and having an extension or pin 38 projecting through a slot 39 in the front casing 2 and having an index adapted to coöperate with suitable setters, preferably "I," "B," and "T," on the outside of the casing indicating instantaneous, bulb, and time exposures, respectively. When the index of this setting member points to the letter "T" the shutter is arranged for making time exposures and the parts are in the position shown by Fig. 3, the operating end of the catch 28 being held out of the path of the pin 21 by the engagement of the pin 32 with the extension 34, and the catch 29 is prevented from moving by the pin 21. When the operating-lever is moved to the position shown in Fig. 4, the master member will be moved to open the shutter, but is prevented from moving far enough to release the shutter-lever 10 by the engagement of the pin 21 with the catch 28, as shown in Fig. 4, and upon relieving the pressure upon the operating-lever the catch 28 will be disengaged and the catch 29 permitted to engage the master member, holding the parts, as shown in Fig. 5, and upon the second pressure upon the operating-lever the catch 29 will be released and the master member permitted to return to the first or normal position, closing the shutter.

In order to make bulb exposures, the setting member 36 is adjusted, as shown in Fig. 7, to prevent the catch 29 from retaining the master member, so that the pressure upon the operating-lever will move and release the master member, allowing it to be retained by the stop or catch 28, and upon releasing the operating-lever said stop 28 will be released and the shutter will be closed.

In order to make instantaneous exposures, the setting member 36 is moved to throw both catches 28 and 29 out of the path of the projection 21 on the master member, so that the operating member when moved will actuate the master member to cause the latch projection 18 to pass freely over and then to engage the pin 8 to throw the shutter open as it is moved back by the spring on the master member until it passes out of contact, when the extension of the member will engage the pin 12 and close the shutter, the projection 22 on the master member passing beneath the end of the operating member freely during this backward movement, so that it is immaterial whether the latter is held or not by the operator.

Inasmuch as the latch connections between the operating-lever and the master member and between the latter and the exposure-lever are formed by simply making these levers of spring metal, turning their ends so that they may flex laterally, while the positive operation is caused by the abrupt sides of the lever in rear of the latch ends, materially simplifies and cheapens the structure and enables the shutter to be produced at nominal cost.

I claim as my invention—

1. The combination with a shutter proper, a projection movable therewith, and a movable operating member, of a spring-actuated master member and latches arranged between the operating member and the master member, and between the latter and the shutter projection, said latches yielding laterally of the plane of movement of the parts and permitting their independent movement when moved relatively in one direction and causing their positive operation and release when moved in the opposite direction.

2. The combination with a shutter and a movable operating member, of a spring-actuated master member, and latches arranged between the operating member and the master member and similar latches arranged between the latter and the shutter, said latches being formed of laterally-yielding spring material and permitting the free relative movement of the parts in one direction and causing their positive operation and released when moved in the opposite direction.

3. The combination with a shutter, a pivoted spring-actuated master member and a latch between it and the shutter yielding laterally of the plane of movement thereof to pass without operating the shutter when moved in one direction and when moved in the opposite direction to engage and release it by the continued movement, of the pivoted operating member and the latch between it and the master member yielding laterally of the plane of the movement of the members on their pivots when they are moved relatively thereon in one direction and serving to operate and release the master member by a continuous movement on the pivot in the opposite direction.

4. In a photographic shutter, the combination with the shutter proper having the projection, the pivoted master-lever composed of laterally-flexible spring material and having the inclined end to engage the shutter projection to pass it when moving in one direction and to actuate the projection when moving in the other, and the projection on said master-lever, of a pivoted operating-lever having its end inclined and composed of laterally-flexible spring material and adapted to engage the projection on the master-lever to move the latter on its pivot and to pass out of contact therewith when moved in one direction and to be deflected laterally by the projection without actuating the master-lever when moved in the opposite direction, and means for controlling the master-lever moved by the operating-lever.

5. In combination with the exposure mechanism of a photographic shutter, a pivoted master-lever and a pivoted operating-lever to engage and move the master-lever and then to pass out of contact with it by a continued movement in one direction on the pivot, and a latch connection between said levers yielding laterally of the plane of movement of their coöperating portions when moved in the opposite direction.

6. In a photographic shutter, a pair of shutter members, a pivoted master-lever, a lever for controlling the shutter members, a latch connection between the controlling-lever and the master member adapted to yield laterally of the plane of movement of the latter when operated on its pivot in one direction and to engage and pass out of contact with the controlling-lever by a continued movement in the opposite direction.

7. In a photographic shutter, the combination with the shutter members, of a pivoted spring-operated master member a laterally-yielding latch connection between it and the shutter members for operating the latter in one direction, and a lever actuated directly by the master-lever for moving the shutter members in the opposite direction.

8. In a photographic shutter, the combination with the shutter members, the pin connected thereto and the lever engaging the pin, of the pivoted spring-operated master member having the laterally-yielding latch adapted to engage the pin and also having the extension engaging the lever to return the shutter.

9. In a photographic shutter, the combination with the shutter members, the pin connected thereto, and the lever engaging the pin, of the pivoted master member having the laterally-yielding latch with the operating-shoulder in rear thereof and adapted to engage the pin and the extension on said member engaging the lever to return the shutter.

10. The combination with a shutter-leaf, and a pivoted spring-actuated master member having a latch connection with the shutter-leaf permitting free movement in one direction, of a pivoted spring-actuated operating-lever pivoted eccentrically of the master member and a latch connection between the lever and member yielding laterally of the plane of movement of the lever to permit free relative movement of the parts in one direction.

11. The combination with the shutter-blades, and a pivoted master member having the laterally-yielding spring-latch projection operating upon the shutter-blades in one direction only, of a pivoted operating member having the spring-latch projection coöperating with the master member and passing out of contact therewith when moved in one direction and yielding laterally of the plane of movement to pass said member without moving it when operated in the opposite direction.

12. The combination with the shutter-blades, a projection connected therewith, the pivoted master-lever having the laterally-yielding inclined projection integral therewith for engaging and operating the first-mentioned projection when moved in one direction only, and an operating-lever having the inclined and laterally-yielding portion for engaging the master-lever when moved in one direction only.

RUDOLPH KLEIN.

Witnesses:
G. WILLARD RICH,
ELIZABETH J. PERRY.